Nov. 3, 1953  J. W. ADAMS  2,658,049
PREPARATION OF SYNTHETIC RUBBER-CARBON BLACK MIXTURES
Filed Nov. 10, 1950
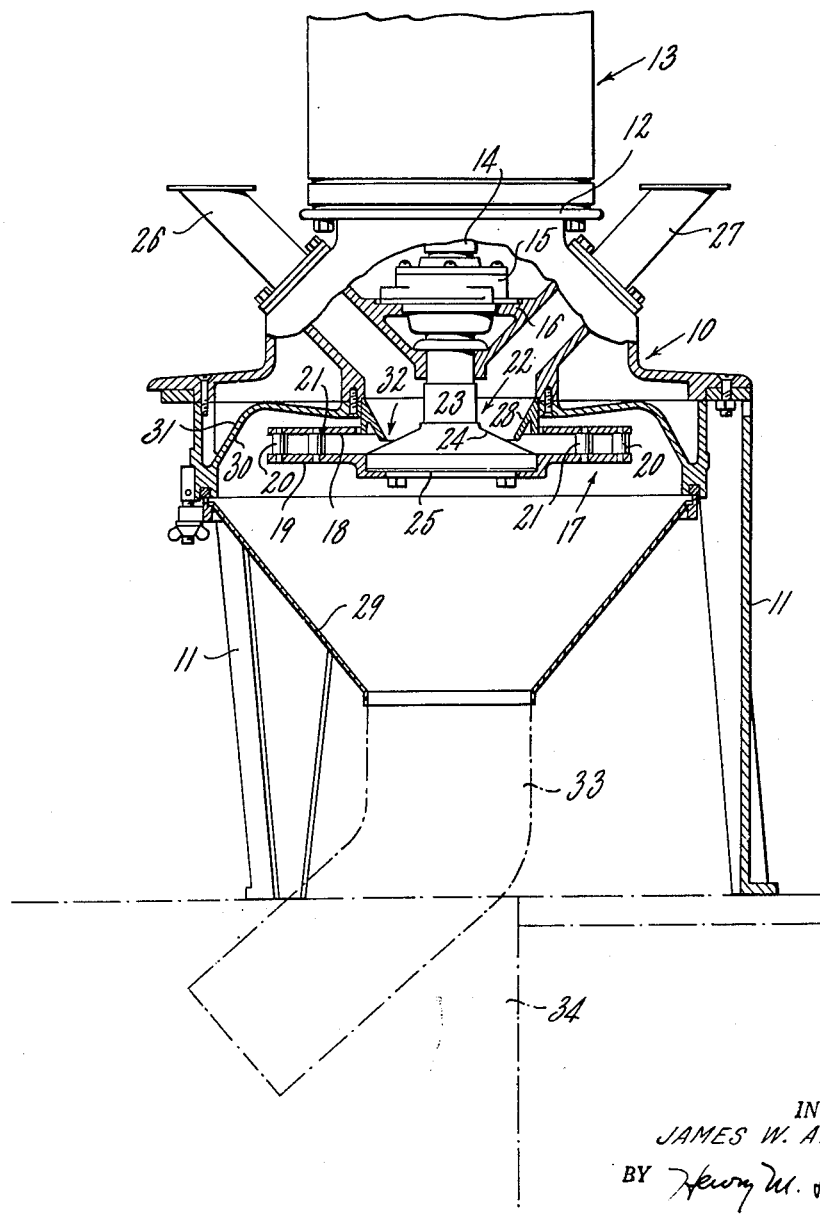
INVENTOR.
JAMES W. ADAMS
BY Henry M. Feigh
ATTORNEY Patented Nov. 3, 1953

2,658,049

UNITED STATES PATENT OFFICE 2,658,049

PREPARATION OF SYNTHETIC RUBBER-CARBON BLACK MIXTURES

James W. Adams, Beacon Falls, Conn., assignor to United States Rubber Company, New York, N. Y., a corporation of New Jersey Application November 10, 1950, Serial No. 195,112

11 Claims. (Cl. 260—41.5)

1

This invention relates to the preparation of synthetic rubber-carbon black mixtures.

Synthetic rubber-carbon black mixtures for further compounding and manufacture into finished articles are commonly prepared today by mixing an aqueous suspension of the carbon black with the synthetic rubber latex and coagulating the mixture in the usual manner with salt and/or acid coagulating agents, filtering the crumb coagula, and washing and drying to form a synthetic rubber-carbon black mix which may be baled and shipped similarly to the ordinary synthetic rubber. Such commercial practice is described in the article by J. C. Madigan and the present applicant entitled "Latex incorporated carbon black for synthetic rubber" in Chemical Engineering Progress, 44, 815–820 (November 1948). The main purpose of thus mixing the carbon black with the synthetic rubber latex before coagulation is to reduce the large amount of energy that would ordinarily be required to mix and properly disperse the dry carbon black into the crude synthetic rubber on a rubber mill or in an internal mixer.

It has been found that the carbon black in the usual synthetic rubber-carbon black mix coagulated from a mixture of the synthetic rubber latex and aqueous carbon black suspension is in the form of exceedingly large agglomerates or flocs which are tremendous in size as compared with those present in the aqueous slurry or suspension of the carbon black before addition to the synthetic rubber latex. Thus large amounts of energy must still be utilized on the rubber mill or in other masticating operations to adequately disperse the carbon black into the synthetic rubber in the usual compounding procedures.

In the preparation of synthetic rubber latices, the synthetic rubber-forming monomers are emulsified in water with an anionic surface active agent and the emulsion is polymerized in the presence of a conventional catalyst and regulator. The monomers, such as butadiene-1,3 and styrene in conventional GR–S latex preparation, are polymerized to the desired extent and the reaction stopped by addition of polymerization inhibitor or shortstopper, after which residual unreacted monomers are removed from the latex by venting gaseous monomers and by steam distillation under reduced pressure of higher boiling monomers. The synthetic rubber particles in the thus formed latex usually have an average particle diameter somewhat less than 100 millimicrons, generally around 70 millimicrons, although it is known to produce so-called large

2 particle size synthetic rubber latices having an average particle diameter of 300 millimicrons or larger.

When aqueous suspensions of carbon black, or so-called carbon black slurries, are prepared for mixing with the synthetic rubber latex, anionic surface active agents are used as dispersing agents for the carbon black which may be ground or comminuted carbon black pellets or the unpelletized carbon black. Despite the relatively small particle size of the individual carbon black particles which may have an average particle diameter from one-half to one times the average particle diameter of the synthetic rubber particles, the carbon black particles are in the form of agglomerates when slurried with water, and become further agglomerated when mixed with the synthetic rubber latex, and this agglomeration is still further increased on coagulation of the mixture of synthetic rubber latex and the carbon black slurry. Thus the synthetic rubber-carbon black mixes prepared by coagulating the synthetic rubber latex and carbon black slurry mixtures contain carbon black in very poorly dispersed form as large agglomerates, some of which are very difficult to disintegrate by milling or plasticating the dried synthetic rubber-carbon black mixes. Efforts to improve the dispersion of the carbon black in the ultimate synthetic rubber-carbon black mix by improving the dispersion of the carbon black mix in the aqueous slurries used in the preparation of the synthetic rubber latex and carbon black dispersion mixtures, have not been successful. No matter how well dispersed the carbon black in the aqueous slurry may be, the synthetic rubber-carbon black mix produced by flocculating mixtures of the slurries of synthetic rubber latex are invariably non-crocking, which shows that the carbon black is enveloped with the synthetic rubber so that little or no carbon black can be detected on the surface of the synthetic rubber-carbon black mix. The agglomeration of the carbon black particles in the aqueous carbon black slurry is aggravated when these slurries are mixed with the synthetic rubber latex. Even though both the synthetic rubber particles in the latex and the carbon black particles in the aqueous slurry are dispersed with compatible or the same anionic surface active agents, making both particles negatively charged and hence capable of being mixed without coagulation on standing and during normal blending operations the more negative charge on the synthetic rubber polymer particles attracts dispersing agent from the carbon black surfaces leaving insufficient surface active agent on the carbon black particles to prevent their further agglomeration.

According to the present invention the dispersion of carbon black in the synthetic rubber in synthetic rubber-carbon black mixes prepared by coagulation of mixtures of synthetic rubber latex and aqueous suspensions of carbon black, is greatly improved. Also according to the present invention, there is a significant improvement in the abrasion resistance of vulcanized compounds made from such synthetic rubber-carbon black mixes.

I have found that if the synthetic rubber latex and carbon black slurry mixture is subjected to a centrifugal motion at high speed and impinged against a baffle before coagulation, and the mixture subsequently coagulated, there is produced a much better dispersion of the carbon black in the rubber in the final synthetic rubber-carbon black mix, and vulcanized compounds, such as tire tread stocks, prepared from such synthetic rubber-carbon black mixes have a greatly improved abrasion resistance, generally from 7% to 10% improvement.

The solids concentration of the mixture of synthetic rubber latex and aqueous carbon black slurry may be as high as possible and will depend, of course, on the concentration of the synthetic rubber latex, the concentration of the carbon black slurry, and the ratio of the carbon black to the synthetic rubber. The solids concentration of the synthetic rubber latex and aqueous dispersion of carbon black will generally be from 15% to 50%, lower than 15% concentrations being uneconomical and higher than 50% concentrations being too difficult to handle. The carbon black content will generally be in the ratio of 30 to 100 parts by weight per 100 parts by weight of the synthetic rubber content.

The imparting of the high speed centrifugal motion to the aqueous slurry of synthetic rubber and carbon black and the impinging of the same against a baffle may be accomplished in an apparatus such as that shown in U. S. patent to Hulse 2,339,737 for destroying insects in dry milled flour and cereals. Such an apparatus is commercially known as an "Entoleter" Mixer and is used for processing dry powdered materials.

The accompanying drawing is a vertical sectional view of the form of apparatus presently used to impart a high speed centrifugal motion to the mixture of synthetic rubber latex and aqueous dispersion of carbon black and impinge the mixture against a baffle.

As shown in the drawing, the machine is provided with a base generally indicated at 10, mounted upon three legs 11, and providing a mounting at its top 12 for a motor 13. Depending from the motor 13 and rotatable thereby is a shaft 14 which goes through a bearing and packing gland assembly 15 which is mounted on the base 10 at 16. At the lower end of the shaft 14 is rigidly mounted a rotor 17 which imparts a centrifugal motion to material fed thereto. The rotor 17 is composed of upper and lower plates or discs 18 and 19, respectively, secured together in spaced relationship by a plurality of spacing pins situated in two circumferential rows, as pins 20 in the outer row and pins 21 in the inner row, the pins in the two rows not being in radial alignment so that they form a tortuous passage for material on the lower disc 19 to which a centrifugal motion is imparted. A mounting hub 22 for the rotor 17 is secured to the shaft 14 by a cylindrical portion 23 at the lower end of which is a flared or conical shaped surface 24 of an end piece to the flat bottom 25 of which is secured the lower disc 19 of the rotor 17. The base 10 has integrally formed therein two inclined inlets or feed conduits 26 and 27 which feed into an annular fixed distributor ring 28 which guides material feed through the inlets 26 or 27 onto the rotating conical shaped surface 24 which spreads the material adjacent the center portion of the disc 17. The inlets 26 and 27 have closure valves, not shown, so that either inlet may be closed when it is desired to feed material to only one inlet. Mounted beneath the rotor 17 upon the base 10 is a hopper 29 to which is connected a conduit, not shown, for carrying the slurry treated in the apparatus for conventional coagulation. The inner surface 30 of the annular portion 31 of the base 10 provides a stationary baffle against which the rotor 17 impinges material fed to it and the baffle directs the material toward the hopper 29.

In practice, the rotor 17 is rotated by means of the motor 13 at such a speed that the peripheral speed of the discs 18 and 19 is at least 8,000 feet per minute, and the mixture of the aqueous dispersion of carbon black and the synthetic rubber latex is fed to the conduit 26 or 27, or to both conduits. The mixture is fed onto the rotating conical surface 24 over which it is evenly distributed by the annular distributor ring 28, which is spaced from the conical surface 24 as at 32. The mixture is fed from the conical surface 24 to the center portion of the lower disc 19 in the space between the discs 18 and 19, and the mixture is thrown outwardly by the rotation of the rotor 17. The path of travel of the mixture is made tortuous by the rows of spacing pins 20 and 21 and the mixture has imparted to it a high speed centrifugal motion by the time it reaches the periphery of the disc 19 where it is thrown out and impinged against the baffle 30 which directs the mixture to the hopper 29 from whence it is guided by an exit pipe 33 to conventional flocculating tank 34. The aqueous dispersion of carbon black and the synthetic rubber latex may also be mixed in the apparatus shown in the figure instead of being premixed by feeding them separately through the inlets 26 and 27, if desired.

As is known, synthetic rubber latices are prepared by the emulsion polymerization of unsaturated monomers, e. g. butadiene-1,3 and styrene in the preparation of GR-S latex, in the presence of conventional peroxygen type catalyst, and if desired, a so-called polymerization regulator, such as alkyl mercaptan having 6 to 18 carbon atoms or an aromatic mercaptan. Conventional peroxygen type catalysts are persalts, e. g. alkali persulfates, alkali perborates, alkali percarbonates; hydrogen peroxide; and organic peroxides, e. g. acyl peroxides, such as diacetyl peroxide, dibenzoyl peroxide, acetyl benzoyl peroxide, and alkyl peroxides, such as tertiary-butyl hydroperoxide and cumene hydroperoxide. The polymerization is allowed to take place at temperatures varying from 0° F. to 150° F. In practice, the emulsion polymerization is not allowed to go to completion because of the excessive time necessary for complete conversion of the polymerizable monomers and because of the undesirable properties that may be imparted to the synthetic rubber when the polymerization has been permitted to go to completion. The polymerization is usually permitted to go to around 50 to 85% of completion, as determined by increase in solids content and is stopped by the addition of a so-called short-stopping agent which prohibits further polymerization of the monomers during their removal. Hydroquinones and similar materials are common short-stopping agents. After addition of the short-stopping agent, the unreacted residual polymerizable monomers are removed from a synthetic rubber latex, as by venting off monomers, e. g. butadiene-1,3 which are gaseous at atmospheric pressure and steam distilling under reduced pressure the residual higher boiling point or liquid monomers, e. g., styrene, and the thus recovered polymerizable monomers may be utilized in subsequent emulsion polymerizations. In general, the synthetic rubber latex will have a solids concentration of from 25% to 50% by weight.

The polymerizable material in the preparation of the synthetic rubber latex may be one or a mixture of butadienes-1,3, for example, butadiene-1,3, methyl-2-butadiene-1,3 (isoprene), chloro-2-butadiene-1,3 (chloroprene), piperylene, 2,3-dimethyl butadiene-1,3. The polymerizable material, as is known, may be a mixture of one or more such butadienes with one or more polymerizable compounds which are capable of forming rubber copolymers with butadienes-1,3; for example, up to 70% of such mixture of one or more compounds which contain a single $CH_2=C<$ group where at least one of the disconnected valences is attached to an electro-negative group, that is, a group which substantially increases the electrical dissymmetry or polar character of the molecule. Examples of such compounds containing a terminal methylene $(CH_2=C<)$ group which are copolymerizable with butadienes-1,3, are aryl olefines, such as styrene, vinyl naphthylene; alpha methyl styrene, para chloro styrene, dichloro styrene; the alpha methylene carboxylic acids and their esters, nitriles and amides, such as acrylic acid, methyl acrylate, methyl methacrylate, acrylonitrile, methacrylonitrile, methacrylamide; methyl vinyl ether, methyl vinyl ketone; vinylidene chloride.

The carbon black which is made into an aqueous slurry and mixed with the synthetic rubber latex, may be any of the carbon blacks used with synthetic rubbers, such as reinforcing or semi-reinforcing channel blacks or furnace blacks, e. g. easy processing channel (EPC) blacks, high abrasion furnace (HAF) blacks, high modulus furnace (HMF) blacks, and semi-reinforcing furnace (SRF) blacks. While carbon black is produced as an extremely fine powder, it cannot be shipped readily long distances or handled in such a state because of its tendencies to pack, bridge, gush, and fly about. It is therefore usually supplied in pellet form and such pellets should be reground in preparing the aqueous slurries. If the fine powdered type of carbon black is available, it may be used as such in preparing an aqueous suspension of the carbon black. Such original powdered form carbon black may be dispersed directly in water with an anionic surface active agent as the dispersing agent in conventional mixing equipment or colloid mills. Where the carbon black is received in pelletized form, the pellets may be dry ground in an impact pulverizer (such as a Mikro Pulverizer), before being dispersed in water with the aid of an anionic surface active agent, or the pelletized carbon black may be wet ground directly with water and an anionic surface active agent in a colloid mill. These methods of preparing the aqueous carbon black slurries are known (see article in Chemical Engineering Progress, 44, 815-820, above referred). In general, the carbon black slurry will have a solids concentration of from 10 to 25% by weight.

The anionic surface active agents that may be used in preparing the synthetic rubber latex and the carbon black slurries are those having a general formula selected from the group consisting of R—COOM, R—SO₃M, and R—OSO₃M, where M represents alkali-metal, ammonium or substituted ammonium (amine) radical, and R represents an organic radical containing at least one group having more than 8 carbon atoms. Examples of such anionic surface-active agents are:

(1) Soaps (e. g. sodium laurate, ammonium stearate, diethanol-ammonium oleate).

(2) Alkyl sulfonates (e. g. dodecyl sodium sulfonate, cetyl potassium sulfonate).

(3) Alkyl sulfates (e. g. sodium dodecyl sulfate, sodium oleyl sulfate).

(4) Sulfonated ethers of long and short chain aliphatic groups (e. g.

$C_{17}H_{33}-O-C_2H_4-SO_3-Na$)

(5) Sulfated ethers of long and short chain aliphatic groups (e. g.

$C_{17}H_{33}-O-C_2H_4-O-SO_3Na$)

(6) Sulfonated alkyl esters of long chain fatty acids (e. g.

$C_{17}H_{33}-\overset{O}{\underset{\|}{C}}-O-C_2H_4-SO_3Na$)

(7) Sulfonated glycol esters of long chain fatty acids (e. g.

$C_{17}H_{33}-\overset{O}{\underset{\|}{C}}-O-C_2H_4-O-SO_3Na$)

(8) Sulfonated alkyl substituted amids of long chain fatty acids (e. g.

$C_{17}H_{33}-\overset{O}{\underset{\|}{C}}-NH-C_2H_4-SO_3Na$ $C_{17}H_{33}-\overset{O}{\underset{\|}{C}}-\underset{\underset{CH_3}{|}}{N}-C_2H_4-SO_3Na$)

(9) Alkylated aryl sulfonates (e. g. isopropyl naphthalene sodium sulfonate, dodecyl benzene sodium sulfonate).

(10) Hydroaromatic sulfonates (e. g. tetrahydronaphthalene sodium sulfonate).

(11) Alkyl sulfosuccinates (e. g. dioctyl sodium sulfosuccinate).

(12) Aryl sulfonate-formaldehyde condensation products (e. g. condensation product of formaldehyde and sodium naphthalene sulfonate,

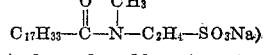

The amount of anionic surface active agent in preparing the synthetic rubber latex and the carbon black slurry is not critical, generally 3 to 6 parts of anionic surface active agent per 100 parts of polymerizable monomers in the preparation of the synthetic rubber latex and 0.5 to 5 parts of anionic surface active agent per 100 parts of carbon black to be dispersed being used.

The following examples illustrate the present invention with more particular reference to the preparation of a GR-S synthetic rubber-carbon black mix, all parts referred to in this specification being by weight.

Example I

A GR-S latex was prepared according to the following formulation:

| | Parts |
|---|---|
| Butadiene | 71 |
| Styrene | 29 |
| Water | 200 |
| Potassium soap of rosin acids | 4 |
| Potassium pyrophosphate | 0.17 |
| Ferrous sulfate, heptahydrate | 0.20 |
| Potassium sulfite | 0.08 |
| Trisodium phosphate | 0.30 |
| Cumene hydroperoxide | 0.10 |
| Alkylated aryl polyether alcohol (Triton R 100) | 0.10 |
| Mixed tertiary mercaptans ($C_{12}$–$C_{14}$ and $C_{16}$) | 0.21 |

The polymerization was carried out at 5° F. for 13 hours, after which the polymerization was stopped by adding 0.23 part of dinitrochlorobenzene. Unreacted butadiene was vented off and unreacted styrene was removed by steam distillation under reduced pressure. 1.25 parts of an antioxidant, diphenylamine-acetone reaction product (BLE), was added to the latex in the form of an aqueous emulsion. The final synthetic rubber latex had a 23% solids concentration.

A carbon black dispersion was made by mixing 100 parts of ground pellets of an easy processing channel (EPC) black in 400 parts of water in the presence of 2.0 parts of partially desulfonated sodium lignin sulfonate (Marasperse CB) as the surface active dispersing agent. The carbon black slurry was prepared by mixing and agitating the pulverized carbon black with the solution of the dispersing agent in water.

The carbon black slurry was mixed with the GR-S latex in amounts to give a ratio of 50 parts of carbon black per 100 parts of synthetic rubber. A portion of the dispersed synthetic rubber-carbon black mixture was coagulated without further treatment and the other portion was passed through the "Entoleter" described above and illustrated in the drawing before coagulation. The slurries were coagulated by conventional sodium chloride and sulfuric acid mixed coagulant, and dried. The two synthetic rubber-carbon black mixes thus prepared were compounded on the mill into a conventional tire tread stock with 3 parts of zinc oxide, 2.5 parts of sulfur, 2.0 parts of benzothiazole disulfide and 2.0 parts stearic acid per 150 parts of the synthetic rubber-carbon black mix, and vulcanized. Samples of the two tire tread stocks were tested for abrasion resistance on a laboratory abrasion tester. In these tests small test wheels were prepared from the compounds by molding and curing for 35, 60 and 110 minutes at a temperature of 292° F. The resistance to abrasion properties of the cured test which were determined using an apparatus of the type described by Lambourn in Trans. Inst. Rubber Ind. 4 p. 210 (1928–1929). The tire tread stock made from the synthetic rubber-carbon black slurry that had been passed through the Entoleter showed a 12% improvement in abrasion resistance over the tread stock made from the synthetic rubber-carbon black slurry that had not been passed through the Entoleter. A second run showed an 8% improvement in abrasion resistance for the tread stock made from the synthetic rubber-carbon black slurry that had been passed through the Entoleter.

Example II

The GR-S latex used was similar to that of Example 1. The carbon black dispersion was made by mixing 100 parts of ground pellets of a high abrasion furnace (HAF) black in 400 parts of water in the presence of 2.5 parts of Marasperse CB as the surface active agent under conditions of agitation similar to Example I.

The carbon black slurry was mixed with the GR-S latex in amounts to give a ratio of 50 parts of carbon black per 100 parts of synthetic rubber. Portions of the synthetic rubber-carbon black slurry were coagulated with and without being passed through the Entoleter. The dried coagula were compounded into a tire tread stock similarly to Example I.

In two runs on the laboratory abrasion tester, the tire tread stock from the synthetic rubber-carbon black slurry that had been passed through the Entoleter showed 10% and 9% improvements over the tire tread stock from the synthetic rubber-carbon black slurry that had not been passed through the Entoleter.

Example III

The GR-S latex was similar to that of Example I. The carbon black dispersion was made by mixing 100 parts of a free flowing powdered high abrasion furnace (HAF) black in 400 parts of water in the presence of 2.5 parts of Marasperse CB as the surface active agent under conditions of agitation similar to Example I.

The carbon black slurry was mixed with the GR-S latex in amounts to give a ratio of 50 parts of carbon black per 100 parts of synthetic rubber. Portions of the synthetic rubber-carbon black slurry were coagulated with and without being passed through the Entoleter. The dried coagula were compounded into tire tread stocks similarly to Example I.

In two runs on the laboratory abrasion tester, the tire tread stock from the synthetic rubber-carbon black slurry that had been passed through the Entoleter showed 5% and 8% improvements over the tire tread stock from the synthetic rubber-carbon black slurry that had not been passed through the Entoleter.

In the tests in Examples I, II and III, there was an average of 9% improvement in abrasion resistance of tire tread stocks made from synthetic rubber-carbon black mixes prepared according to the present invention. It is noted that U. S. Patent No. 2,354,424 to Novotny et al. discloses passing a synthetic rubber latex and carbon black dispersion mixture through a colloid mill before coagulation. I have attempted to pass usable amounts of synthetic rubber-carbon black mixes having 15% or more solids concentration through a conventional colloid mill, viz. a Bartlett-Snow mill (C. O. Bartlett & Snow Co., Cleveland, Ohio), and each time the machine became fouled with coagulum. This condition was brought about by the high shear forces that agglomerated the latex and carbon black particles. Colloid mills where there are inherently high shear forces may not be used as a substitute for the Entoleter type of apparatus in the present invention. It is also noted that U. S. Patent No. 2,466,027 to Horney et al. homogenizes compounding ingredients, which may include carbon black, in large amounts of water and adds latex with high speed agitation to give a dilute compounded latex before coagulation and manufacture of sponge rubber from the compounded rubber. While a Waring Blendor laboratory type of high speed mixer when used to homogenize a slurry of synthetic rubber latex and carbon black at a 15% or higher solids concentration will give improvement in abrasion resistance of tread stocks made from the rubber-carbon black mix, there is no "scaled up" apparatus of commercial size using low or high speed propeller or impeller type of mixing, stirring or agitating means that will give the same type of improvement. In commercial size apparatus, it is only by subjecting the synthetic rubber latex and carbon black slurry to a high speed centrifugal motion and impinging it against a baffle before coagulating the same that the improvement in abrasion resistance of cured stocks can be obtained.

Having thus described my invention, what I claim and desire to protect by Letters Patent is:

1. In the preparation of a synthetic rubber-carbon black mix by coagulation of a mixture of a synthetic rubber latex and an aqueous dispersion of carbon black, the step of imparting a high speed centrifugal motion to an uncoagulated mixture of an aqueous dispersion of carbon black and a synthetic rubber latex in which the carbon black particles and synthetic rubber particles are both negatively charged, and impinging the mixture against a stationary baffle, and thereafter coagulating the thus treated mixture.

2. In the preparation of a synthetic rubber-carbon black mix by coagulation of a mixture of a synthetic rubber latex and an aqueous dispersion of carbon black, the step of imparting a high speed centrifugal motion from a horizontally rotating disc having a peripheral speed over 8,000 feet per minute, to an uncoagulated mixture of an aqueous dispersion of carbon black containing an anionic surface-active agent and a synthetic rubber latex containing an anionic surface-active agent in which the carbon black particles and synthetic rubber particles are both negatively charged, and impinging the mixture against a stationary baffle, and thereafter coagulating the thus treated mixture.

3. In the preparation of a synthetic rubber-carbon black mix by coagulation of a mixture of a synthetic rubber latex and an aqueous dispersion of carbon black, the step of imparting a high speed centrifugal motion from a horizontally rotating disc having a peripheral speed from 8,000 to 20,000 feet per minute, to an uncoagulated mixture of an aqueous dispersion of carbon black and a synthetic rubber latex in which the carbon black particles and synthetic rubber particles are both negatively charged, and impinging the mixture against a stationary baffle, and thereafter coagulating the thus treated mixture.

4. In the preparation of a synthetic rubber-carbon black mix by coagulation of a mixture of a synthetic rubber latex and an aqueous dispersion of carbon black, the step of imparting a high speed centrifugal motion from a horizontally rotating disc having a peripheral speed over 8,000 feet per minute to an uncoagulated mixture of an aqueous dispersion of carbon black and a synthetic rubber latex in which the carbon black particles and synthetic rubber particles are both negatively charged, and impinging the mixture against a stationary baffle annularly disposed around said rotating disc, and thereafter coagulating the thus treated mixture.

5. In the preparation of a synthetic rubber-carbon black mix by coagulation of a mixture of a synthetic rubber latex and an aqueous dispersion of carbon black, the step of imparting a high speed centrifugal motion from a horizontally rotating disc having a peripheral speed from 8,000 to 20,000 feet per minute to an uncoagulated mixture of an aqueous dispersion of carbon black containing an anionic surface-active agent and a synthetic rubber latex containing an anionic surface-active agent in which the carbon black particles and synthetic rubber particles are both negatively charged, and impinging the mixture against a stationary baffle annularly disposed around said rotating disc, and thereafter coagulating the thus treated mixture.

6. In the preparation of a synthetic rubber-carbon black mix by coagulation of a mixture of a synthetic rubber latex and an aqueous dispersion of carbon black, the step of imparting a high speed centrifugal motion to an uncoagulated mixture of an aqueous dispersion of carbon black containing an anionic surface-active agent and a synthetic rubber latex containing an anionic surface-active agent in which the carbon black particles and synthetic rubber particles are both negatively charged, said latex comprising an aqueous emulsion polymerizate of polymerizable material selected from the group consisting of butadienes-1,3 and mixtures of butadienes-1,3 with material which contains a single $CH_2=C<$ group and is copolymerizable with butadienes-1,3, and impinging the mixture against a stationary baffle, and thereafter coagulating the thus treated mixture.

7. In the preparation of a synthetic rubber-carbon black mix by coagulation of a mixture of a synthetic rubber latex and an aqueous dispersion of carbon black, the step of imparting a high speed centrifugal motion to an uncoagulated mixture of an aqueous dispersion of carbon black and a synthetic rubber latex in which the carbon black particles and synthetic rubber particles are both negatively charged, said latex comprising an aqueous emulsion polymerizate of butadiene-1,3 and styrene, and impinging the mixture against a stationary baffle, and thereafter coagulating the thus treated mixture.

8. In the preparation of a synthetic rubber-carbon black mix by coagulation of a mixture of a synthetic rubber latex and an aqueous dispersion of carbon black, the step of imparting a high speed centrifugal motion from a horizontally rotating disc having a peripheral speed over 8,000 feet per minute to an uncoagulated mixture of an aqueous dispersion of carbon black and a synthetic rubber latex in which the carbon black particles and synthetic rubber particles are both negatively charged, said latex comprising an aqueous emulsion polymerizate of polymerizable material selected from the group consisting of butadienes-1,3 and mixtures of butadienes-1,3 with material which contains a single $CH_2=C<$ group and is copolymerizable with butadienes-1,3, and impinging the mixture against a stationary baffle, and thereafter coagulating the thus treated mixture.

9. In the preparation of a synthetic rubber-carbon black mix by coagulation of a mixture of a synthetic rubber latex and an aqueous dispersion of carbon black, the step of imparting a high speed centrifugal motion from a horizontally rotating disc having a peripheral speed over 8,000 feet per minute to an uncoagulated mixture of an aqueous dispersion of carbon black containing an anionic surface-active agent and a synthetic rubber latex comprising an aqueous emulsion polymerizate of butadiene-1,3 and styrene containing an anionic surface-active agent in which the carbon black particles and synthetic rubber particles are both negatively charged, and impinging the mixture against a stationary baffle, and thereafter coagulating the thus treated mixture.

10. In the preparation of a synthetic rubber-carbon black mix by coagulation of a mixture of a synthetic rubber latex and an aqueous dispersion of carbon black, the step of imparting a high speed centrifugal motion from a horizontally rotating disc having a peripheral speed from 8,000 to 20,000 feet per minute to an uncoagulated mixture of an aqueous dispersion of carbon black containing an anionic surface-active agent and a synthetic rubber latex containing an anionic surface-active agent in which the carbon black particles and synthetic rubber particles are both negatively charged, said latex comprising an aqueous emulsion polymerizate of polymerizable material selected from the group consisting of butadienes-1,3 and mixtures of butadienes-1,3 with material which contains a single $CH_2=C<$ group and is copolymerizable with butadienes-1,3, and impinging the mixture against a stationary baffle annularly disposed around said rotating disc, and thereafter coagulating the thus treated mixture.

11. In the preparation of a synthetic rubber-carbon black mix by coagulation of a mixture of a synthetic rubber latex and an aqueous dispersion of carbon black, the step of imparting a high speed centrifugal motion from a horizontally rotating disc having a peripheral speed from 8,000 to 20,000 feet per minute to an uncoagulated mixture of an aqueous dispersion of carbon black and a synthetic rubber latex in which the carbon black particles and synthetic rubber particles are both negatively charged, said latex comprising an aqueous emulsion polymerizate of butadiene-1,3 and styrene and impinging the mixture against a stationary baffle annularly disposed around said rotating disc, and thereafter coagulating the thus treated mixture.

JAMES W. ADAMS.

References Cited in the file of this patent

UNITED STATES PATENTS

| Number | Name | Date |
|---|---|---|
| 2,502,445 | Fash | Apr. 4, 1950 |